United States Patent [19]

Keegan

[11] Patent Number: 4,783,310

[45] Date of Patent: Nov. 8, 1988

[54] HEAT BARRIER FOR USE IN A NUCLEAR REACTOR FACILITY

[75] Inventor: Charles P. Keegan, South Huntingdon Twp., Westmoreland County, Pa.

[73] Assignee: The United States of America as represented by the United States Department of Energy, Washington, D.C.

[21] Appl. No.: 923,232

[22] Filed: Oct. 27, 1986

[51] Int. Cl.$^4$ .............................................. G21C 11/08
[52] U.S. Cl. ................................... 376/288; 376/289; 376/290; 250/519.1
[58] Field of Search ............... 376/290, 291, 289, 288, 376/205, 287; 250/519.1, 517.1

[56] References Cited

U.S. PATENT DOCUMENTS

| | | | |
|---|---|---|---|
| 3,138,561 | 6/1964 | Labino | 376/288 |
| 3,926,722 | 12/1975 | Dupen | 376/205 |
| 3,945,887 | 3/1976 | Lemercier | 376/289 |
| 4,055,464 | 10/1977 | Lemercier | 376/289 |
| 4,055,465 | 10/1977 | Lemercier | 376/289 |
| 4,070,221 | 1/1978 | Anthony | 376/205 |
| 4,127,444 | 11/1978 | Gama et al. | 376/291 |
| 4,251,279 | 2/1981 | Ekdahl | 501/35 |
| 4,294,878 | 10/1981 | Cunningham et al. | 264/237 |
| 4,303,553 | 12/1981 | Aoki et al. | 376/288 |
| 4,360,736 | 11/1982 | Weissonfluh | 376/287 |
| 4,417,925 | 11/1983 | Cherry | 501/95 |
| 4,676,946 | 6/1987 | Feinzig et al. | 376/289 |

FOREIGN PATENT DOCUMENTS 2300289  9/1976  France ............................... 376/290

*Primary Examiner*—Deborah L. Kyle
*Assistant Examiner*—Daniel Wasil

[57] ABSTRACT

A thermal barrier for use in a nuclear reactor facility is disclosed herein. Generally, the thermal barrier comprises a flexible, heat-resistant web mounted over the annular space between the reactor vessel and the guard vessel in order to prevent convection currents generated in the nitrogen atmosphere in this space from entering the relatively cooler atmosphere of the reactor cavity which surrounds these vessels. Preferably, the flexible web includes a blanket of heat-insulating material formed from fibers of a refractory material, such as alumina and silica, sandwiched between a heat-resistant, metallic cloth made from stainless steel wire. In use, the web is mounted between the upper edges of the guard vessel and the flange of a sealing ring which surrounds the reactor vessel with a sufficient enough slack to avoid being pulled taut as a result of thermal differential expansion between the two vessels. The flexible web replaces the rigid and relatively complicated structures employed in the prior art for insulating the reactor cavity from the convection currents generated between the reactor vessel and the guard vessel.

20 Claims, 5 Drawing Sheets

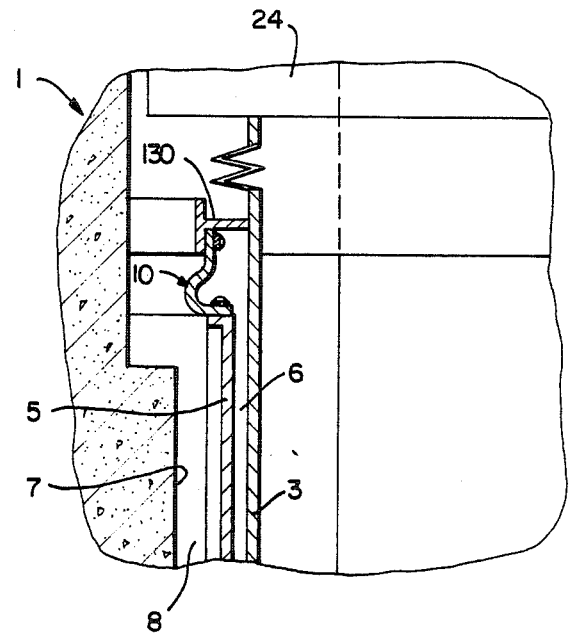
FIG 5
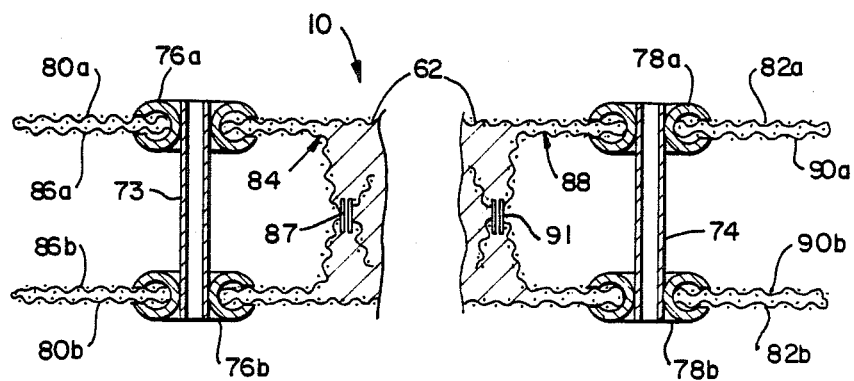
FIG IC

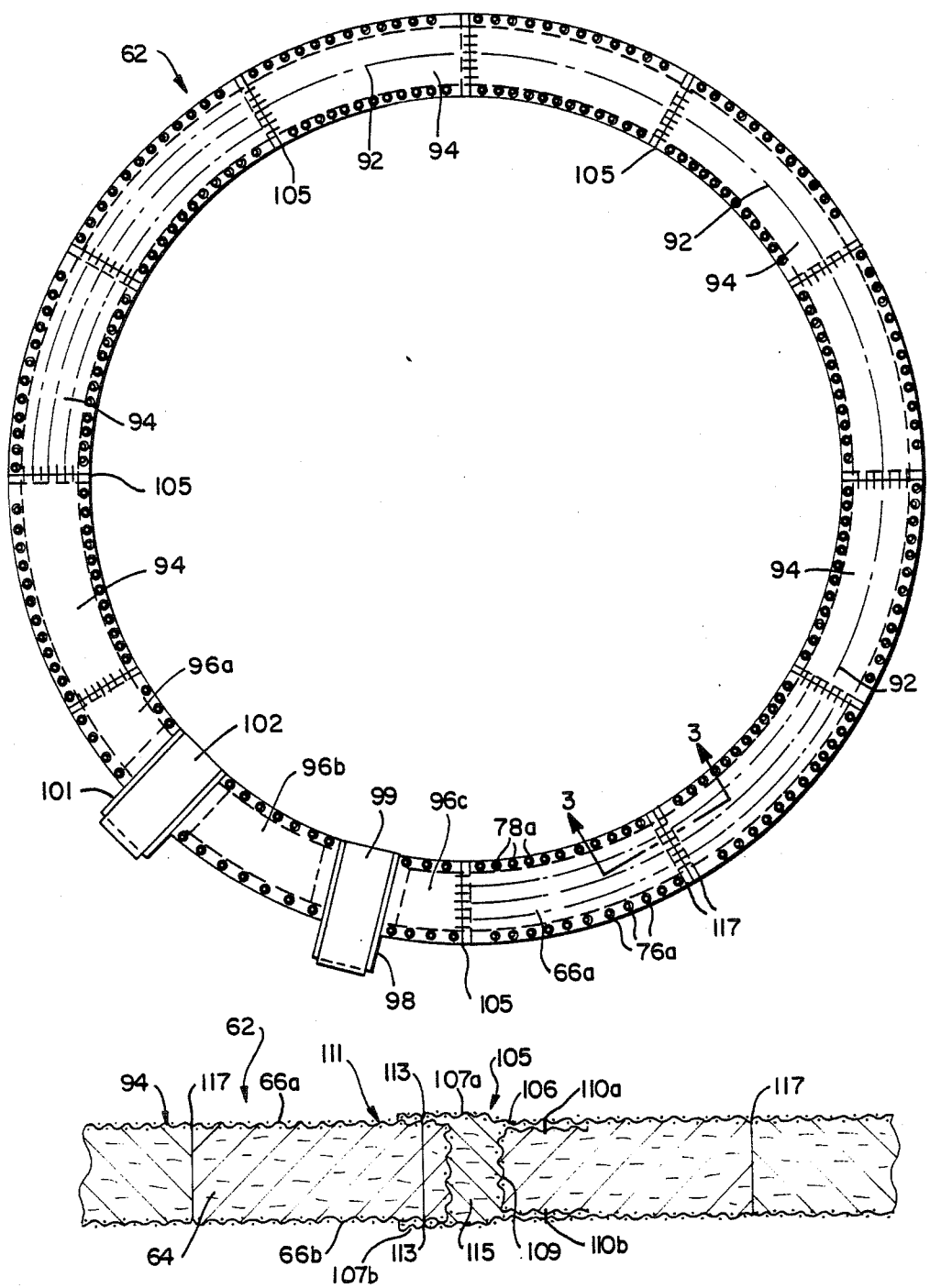

HEAT BARRIER FOR USE IN A NUCLEAR REACTOR FACILITY

BACKGROUND OF THE INVENTION

1. Field of the Invention

This invention generally relates to a flexible, radiation-resistant heat barrier which is capable of substantially blocking convection currents of a relatively hot gas from entering a cooler atmosphere, but yet is gas permeable. It also reduces heat transfer due to thermal radiation and conduction between the two regions. It is particularly useful in liquid metal nuclear reactor plants for insulating the relatively cool atmosphere within the reactor cavity from the hot gas convection currents generated in the annular space between the reactor vessel and the guard vessel.

2. Description of the Prior Art

Heat barriers for use in liquid metal reactor plants are known in the prior art. Generally speaking, such heat barriers cover the annulus between the reactor vessel and the guard vessel in order to prevent the free convection of hot gases generated in this annulus from entering the significantly cooler atmosphere within the reactor cavity. While it would be possible to operate a liquid metal reactor without such a thermal barrier, the convection currents generated by the almost 900° F. outer wall of the reactor vessel would greatly increase the heat load on the reactor cavity cooling system. Since the difference in calculated heat load for a typical plant with and without such a device is 60,000 vs. 500,000 BTU's/hour, the provision of such a heat barrier is a highly desirable, if not essential, feature.

In the prior art, such heat barriers have generally been formed from an overlapping configuration of sliding, segmented insulating panels mounted on the top edge of the guard vessel. Each of these panels is spring loaded against the wall of the reactor vessel to accommodate differential thermal expansion between the reactor vessel and the guard vessel. The panels which engage the reactor vessel are made from rigid insulation so that their vessel engaging edges will not abrade the reactor vessel and will resist wear from the friction they experience from the longitudinal and lateral differential thermal expansion between the guard vessel and the reactor vessel.

Unfortunately, such prior art thermal barriers are mechanically complex (somewhat like the iris diaphragm of a camera), and have the potential for springing a thermal leak due to wear or binding of the sliding panels or from the breaking of a spring. Since such thermal barriers are located in an area around the reactor vessel that is virtually inaccessible after plant startup due to the very high ambient radiation levels, repairs on such prior art barriers are extremely difficult, if not impossible, to perform. While it has been proposed to obviate the problems associated with such prior art barriers by eliminating the barrier and partially filling the annular space between the reactor vessel and the guard vessel with some sort of insulation materials, this annulus must be kept free so that it offers an unimpeded flowpath for any liquid sodium which may leak into the guard vessel. It must also be kept free to allow the welds of the vessels to be routinely inspected by a wheeled, remote camera that crawls in the annulus.

Clearly, there is a need for an improved thermal barrier which is capable of reliably insulating the reactor cavity from the hot convection currents generated by the outer walls of the reactor vessel for the lifetime of the plant with no planned maintenance. Ideally, such a barrier should be simple and relatively inexpensive in construction, and easy to install on virtually any of the existing liquid metal reactor designs with a minimum of extra weldments on the guard vessel or reactor vessel. Finally, the barrier should be able to block such convection currents uniformly throughout its area despite the substantial dimensional changes between the guard vessel, the reactor vessel, and the rest of the reactor facility by virtue of thermal differential expansion, and should also have some degree of gas permeability so that it will not break or deform in respnse to a differential gas pressure between the annulus and the reactor cavity which would occur during reactor heat-up, cool-down or in the event of a major sodium leak into the annulus.

SUMMARY OF THE INVENTION

Generally speaking, the invention is a thermal barrier for use in a nuclear reactor plant which achieves all of the aforementioned criteria by means of an annular web of flexible, heat-resistant and radiation-resistant material that insulates the reactor cavity from the convection currents generated between the reactor vessel and the guard vessel. The web preferably includes a blanket of insulating material formed from fibers of a refractory material, such as alumina-silica. This blanket may be wrapped in a metallic flexible fabric, such as stainless steel cloth, in order to protect the blanket of insulatory fibers from frictional abrasion when the blanket flexes in response to the thermal differential expansion of the guard vessel. Such cloth also lends tensile and shear strength to the resulting web. The web is preferably mounted over the annular opening between the reactor vessel and the guard vessel with sufficient slack to avoid being pulled taut as a result of differential thermal expansion between these two vessels.

The web may be detachably or permanently mounted between the reactor vessel and the guard vessel by means of a plurality of clamping members that may take the form of a series of arcuate, angular bars. Both the inner and the outer edges of the web may include upper and lower sets of bolt-receiving eyelets which are registrable with bolt-receiving bores in the clamping members. The edges of the web may be secured across the annular opening between the reactor vessel, guard vessel and the reactor cavity by a plurality of bolts which extend through bores in the clamping members and through the eyelets in the edges of the web. While some compression of the web along its edges is desirable to restrict the free convection of hot gas currents, bolt-receiving, sleeve-type spacers are preferably positioned through adjacent upper and lower eyelets in the web to prevent the compressive forces applied by the clamping members from over-compressing the blanket along the edges of the web, which in turn could create thermal leaks.

The metallic fabric used to wrap the blanket of insulatory material may be woven from No. 304 stainless steel yarn. To accommodate conduits running between the two vessels, such as the sodium overflow and make-up conduits, the web may further include one or more semi-circular boot structures which loosely surround such conduits. The web may also include one or more securing seams around its circumference to prevent the blanket of insulating material from gathering or bunching up in response to the flexing it experiences as a result of thermal differential expansion. Finally, while the web preferably includes a blanket of insulatory material to substantially prevent convection currents generated between the two vessels from entering the reactor cavity, the thickness and density of the blanket are chosen so that there is a certain amount of gas permeability. Such gas permeability allows bleed-off of gases during the normal heat-up and cool-down of the reactor and would prevent damaging pressure differentials from occurring in the event of an accidental sodium spill in the annular space betwen the reactor vessel and the guard vessel.

The invention further includes a process for insulating the reactor cavity from such convection currents which generally comprises the step of mounting a flexible, heat-resistant web of material as heretofore described between the upper edge of the walls of the guard vessel and a component of the reactor plant such as the sealing ring.

BRIEF DESCRIPTION OF THE SEVERAL FIGURES

FIG. 1C is an even more enlarged, cross-sectional view of the web illustrated in FIG. 1A without the clamping bars or bolts showing how the inner and outer edges of the web are constructed;

FIG. 2B is a plan view of the web of the heat barrier, shown without the clamping members;

FIG. 3 is an enlarged, cross-sectional view of the web illustrated in FIG. 2B across the line 3—3, showing how the arcuate sections forming the web are joined together;

FIG. 5 illustrates an alternative mounting configuration of the barrier of the invention, as it might be mounted in a liquid metal reactor having a ground-supported reactor vessel.

DETAILED DESCRIPTION OF THE PREFERRED EMBODIMENT

General Overview of the Structure and Function of the Invention

Figure 1A:
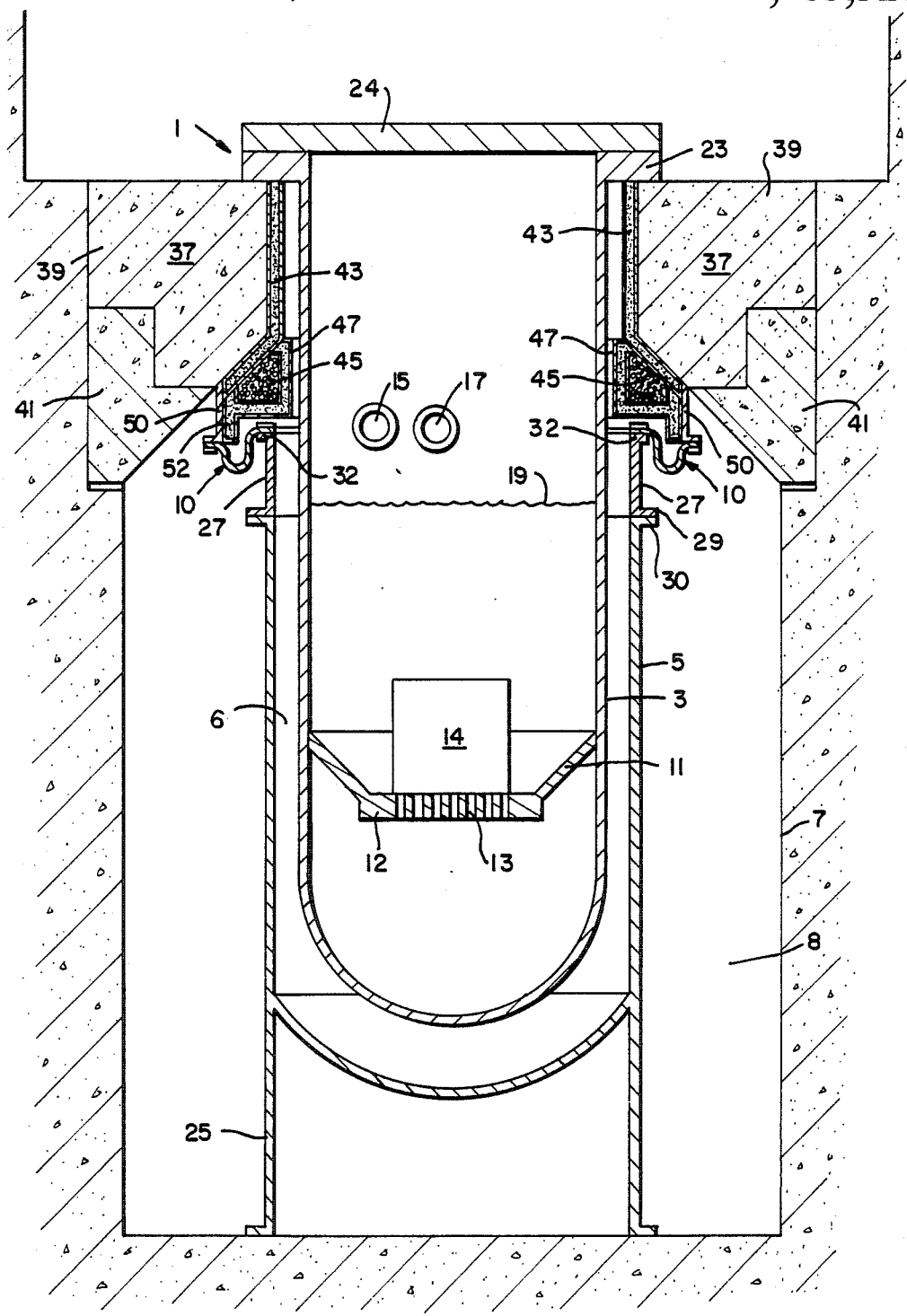
FIG. 1A is a cross-sectional side view of a liquid metal reactor with the heat barrier of the invention mounted between the reactor cavity, and the annulus between the reactor vessel and the guard vessel.
Figure 1B:
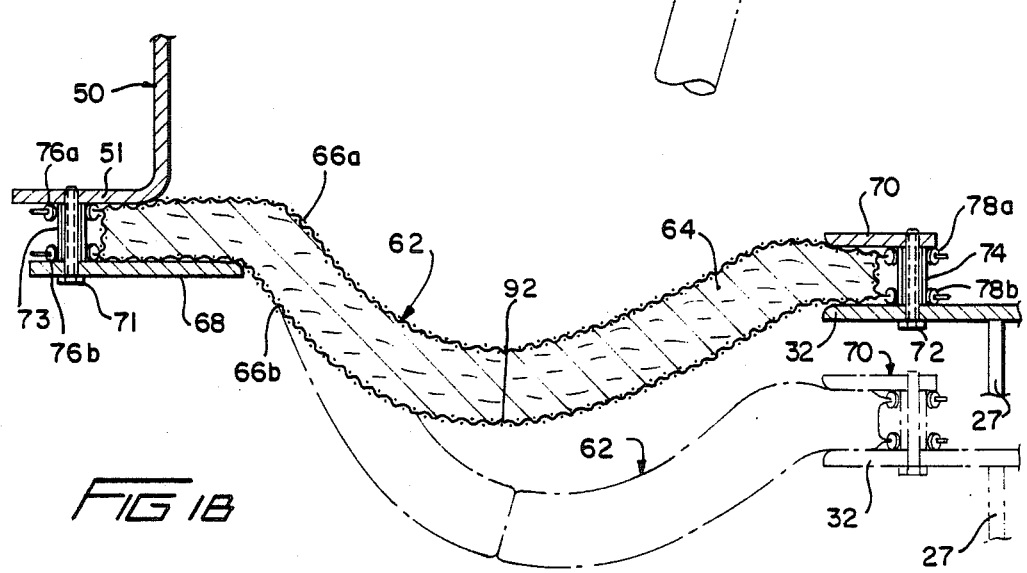
FIG. 1B is an enlargement of the cross-sectional side view of the heat barrier illustrated in FIG. 1A, showing how it flexes in response to the thermal differential expansion and contraction of the guard vessel.

With reference to FIGS. 1A and 1B, wherein like components are designated with like numerals throughout all the several figures, the heat barrier of the invention is particularly adapted for use in connection with a liquid metal reactor facility 1. Such reactor facilities generally include a reactor vessel 3 for containing a pool of liquid sodium, and a guard vessel 5 which circumscribes the reactor vessel 3 for preventing an accidental sodium spillout from uncovering the nuclear reactor core 14 of the reactor vessel 3. An annular space 6 is defined between the outer wall of the reactor vessel 3 and the inner wall of the guard vessel 5. This annular space 6 is filled with an inert gas, such as nitrogen, which will not react with the liquid sodium in the reactor vessel 3. A generally cylindrical reactor cavity structure 7 circumscribes the guard vessel 5, thereby defining still another annular space 8 between the outer wall of the guard vessel 5 and the inner wall of the cavity structure 7. Like annular space 6, this space 8 is filled with nitrogen gas.

Because of its location between the hot reactor vessel 3 and the insulation (not shown) on the outside of the guard vessel 5, the nitrogen atmosphere in the annular space 6 between the reactor vessel 3 and the guard vessel 5 approaches 900° F. By contrast, the temperature of the nitrogen atmosphere within the annular cavity space 8 is only about 120° F. As will be discussed in more detail hereinafter, the heat barrier 10 of the invention is mounted between the annular spaces 6 and 8 in order to prevent the hot convection currents of nitrogen within the annular space 6 from mixing into and heating up the atmosphere within the annular space 8 defined by the reactor cavity structure 7.

The interior of the reactor vessel 3 includes a core support cone 11 formed from a support plate 12 having a plurality of liquid sodium conducting bores 13 therein. This core support cone 11 supports the nuclear core 14 within the pool of liquid sodium present within the reactor vessel 3. The upper interior portion of the reactor vessel 3 includes both a sodium overflow conduit 15 and a sodium make-up conduit 17 that maintains the sodium level inside the reactor vessel 3 between prescribed upper and lower limits and also provides for additional cooling of the sodium inside the reactor vessel 3 during off-normal conditions. Under normal operating circumstances, the sodium level 19 is below both the sodium overflow and make-up conduits 15 and 17, but well above the upper level of the nuclear core 14. The upper edge of the reactor vessel 3 is circumscribed by a support flange 23. This flange 23 overlies a support ledge 37 that forms part of the reactor cavity structure 7. The top portion of the reactor cavity 3 is radiologically sealed by means of a disc-shaped closure head 24 which overlies it.

The guard vessel 5 of the liquid metal reactor 1 is generally cylindrically shaped and surrounds the reactor vessel 3 from the sodium overflow and makeup conduits 15 and 17 to the bottom-most portion of this vessel 3. At its bottom portion, the guard vessel 5 includes a support skirt 25 for supporting the vessel 5 is a non-contacting, concentric relationship with the reactor vessel 3. At the top of the guard vessel, a guard vessel extension 27 is provided to extend the reactor vessel/guard vessel annulus 6 to allow inspection of certain reactor vessel welds with a wheeled remote camera that crawls in this annulus. This guard vessel extension 27 includes a bottom flange 29 which is bolted to a top flange 30 of the guard vessel proper, as well as a top flange 32. As is indicated in FIG. 1A, one edge of the ring-shaped heat barrier 10 is mounted around this top flange 32.

Turning now to the reactor cavity structure 7, a support ledge 37 is provided at the upper end of this structure 7. Since the support flange 23 overlies the support ledge 37, this ledge 37 supports the entire weight of the reactor vessel 3. The top portion 39 of the support ledge 37 is formed from a steelplate structure filled with heat-resistant serpentine concrete to allow the ledge 37 to support the weight of the reactor vessel 3 and to retain its shielding capabilities in spite of the 900° F. temperatures it experiences due to the proximity of the reactor vessel 3. Outboard from the support ledge 37, the reactor cavity walls 7 are formed from ordinary concrete which has been steel-reinforced. The inclusion of a heat-resistant material such as serpentine concrete in the reactor cavity walls 7 is not necessary since this region of the facility is cooled by the reactor cavity atmosphere. To further protect the support ledge 37 from the 900° F. reactor vessel temperatures the inenr wall of the top portion 39 is lined with canned alumina-silica insulation 43. In order to afford an extra margin of safety to personnel working near the reactor vessel 3, a ring of radiological shielding 45 (which is preferably formed from boron carbide pellets) is also disposed between the top flange 32 of the guard vessel extension 27, and the bottom surface of the top portion 39 of the support ledge 37. Like the exposed wall of the top portion 39 of support ledge 37, this ring 45 of radiological shielding is also lined with canned alumina-silica insulation. Directly behind the shielding ring 45 is a seal ring 50 which terminates in a ring-angle bracket 51. Like the exposed walls of the ledge 37 and shielding ring 45, the inner wall of the seal ring 50 is likewise lined with canned insulation 52. As is indicated in FIG. 1A, the outer edge of the ring-shaped heat barrier 10 is connected to the angular terminus 51 of the seal ring 50.

In operation, the liquid sodium within the reactor vessel 30 is continuously circulated from the bottom of the vessel 3 through the bores 13 of the core-support plate 12, and one through the body of the core 14 itself by means of a pump (not shown) located outside of the vessel 3 and connected to the vessel 3 with primary loop piping (not shown). The heat imparted to this liquid sodium by the nuclear core 14 is continuously removed from the reactor vessel 3 by means of a heat exchanger (also not shown) which is also located in the primary piping loop. Under normal operating conditions, the temperature of the liquid sodium within the reactor vessel 3 will exceed 900° F. This heat is conducted through the stainless steel walls of the reactor vessel 3, and heats the nitrogen atmosphere in the annular space 6 between the reactor vessel 3 and the guard vessel 5 to a temperature which is near 900° F. If the hot nitrogen within the annular space 6 were allowed to freely circulate into the much cooler nitrogen between the walls of the reactor cavity structure 7 and the guard vessel 5, the heat load on the reactor cavity cooling system (not shown) would be severe. To prevent such a transfer of heat from occurring as a result of a convection flow between the annular spaces 6 and 8, the ring-shaped heat barrier 10 of the invention is disposed between these spaces. Specifically, the inner edge of the ring-shaped heat barrier is clamped onto the top flange 32 of the guard vessel extension 27, while the outer edge of the barrier 10 is clamped onto the angular terminus 51 of the sealing ring 50 extending down from the support ledge 37. As will be discussed in more detail hereinafter, the width of the annular heat barrier 10 is selected so that a certain amount of radial slack will be present when its inner and outer edges are connected to the flange 32 and sealing ring 50. Additionally, a certain amount of circumferential slack is provided between the bolts which connect the inner and outer edges of the heat barrier 10 to the flange 32 and sealing ring 50. This radial and circumferential slack, coupled with the flexibility of the heat barrier 10, allows the barrier 10 to effectively accommodate dimensional changes in the walls of the guard vessel 5 and the sealing ring 50 resulting from thermal differential expansion and contraction.

Specific Description of the Structure and Operation of the Preferred Embodiment

Figure 2A:
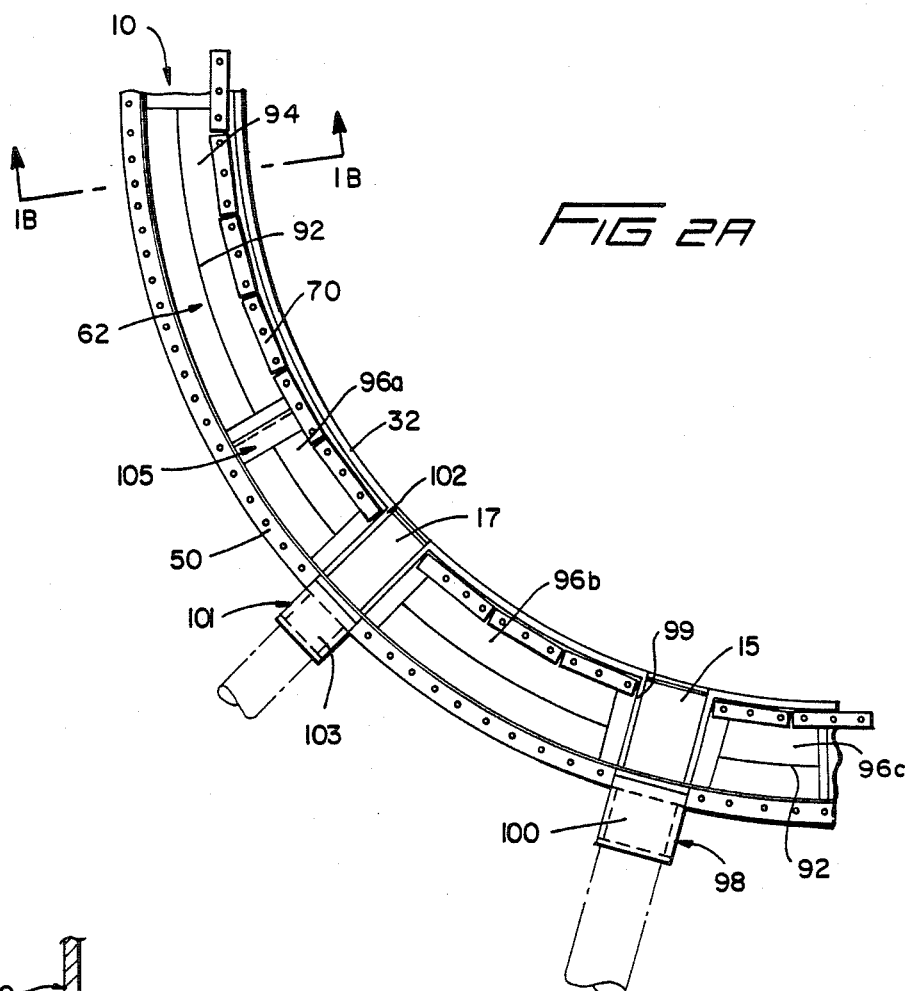
FIG. 2A is a partial plan view of the heat barrier of FIG. 1A as it would appear if the ring of radiological shielding above it were removed, illustrating the manner by which the web of the barrier clamps to the sealing ring and the upper flange of the guard vessel extension.

With reference now to FIGS. 1B and 2A, the heat barrier 10 of the invention generally comprises an annular web 62 of flexible, heat-resistant material. Web 62 is formed from a blanket 64 of nonwoven fibers of a refractory material, such as alumina-silica, which is sandwiched between a top and bottom layer 66a, 66b of a heat-resistant fabric, such as stainless steel cloth. Nonwoven fibers of alumina-silica are preferred over other known types of fibrous insulation, such as fiberglass, for a number of reasons. First of all, alumina-silica fibers in such a non-woven form have a relatively higher R factor, which in turn minimizes the bulk of the resulting web 62. The applicant has further found through experience that the R factor of a blanket 64 formed from such fibers remains substantially the same even if the thickness of the blanket is altered by an external compressive force. It also significantly reduces the heat loss to the reactor cavity 7 and 8 due to thermal radiation and conduction from the reactor vessel 3 through the heat barrier 10 itself. Additionally, alumina-silica fibers have demonstrated an excellent resistance to radiation degradation, whereas other types of insulating materials, such as fiberglass, have not. Finally, while such a blanket effectively blocks convection currents, it is also gas permeable. Such gas permeability prevents sudden changes in the pressure of the gas in the annular space 6 (which can occur during plant start-up, refueling, or from accidental sodium spills) from rupturing the barrier 10.

In the preferred embodiment, the blanket 64 is formed from Cerawool® approximately two inches thick and having a density of approximately eight pounds per cubic foot. Such non-woven alumina-silica Cerawool® insulation is available from the Johns-Manville Insulation Center, in Denver, Colo. The top and bottom layers 66a, 66b of heat-resistant fabric which over-lie the top and bottom surfaces of the blanket 64 are preferably formed from cloth woven from No. 304 stainless steel yarn. Such woven, stainless steel material is available from the Woven Structures Division of Hitco, located in Compton, Calif. Like the previously described alumina-silica fibers forming the web 62, such stainless steel cloth has been found to exhibit excellent heat and radiation resistance, as well as the combination of strength, flexibility and gas permeability necessary to create, in combination with the non-woven blanket 64, a web 62 which is lightweight and gas permeable, yet which possesses a considerable degree of tensile strength and resistance to mechanical abrasion and shock.

With reference still to FIGS. 1B and 2A, the outer and inner edges of the annular web 62 are secured between the angular terminus 51 of the sealing ring 50 and the upper flange 32 of the guard vessel extension 27 by means of a plurality of slightly arcuate-shaped clamping bars 68 and 70, secured by a plurality of bolts 71 and 72, respectively. The manner in which the outer and inner clamping bars 68, 70 and their respective bolts 71, 72 secure the edges of the web 62 is best seen with respect to FIG. 1C. Both the outer and the inner edges of the web 62 include a plurality of upper and lower eyelets 76a, 76b and 78a, 78b respectively. These upper and lower eyelets 76a, 76b and 78a, 78b are positioned in registry with one another so that bolts may be inserted completely through the edges of the web 62. In order to ensure that the clamping force applied by the outer and inner bolts 71, 72 will not unduly compress the edges of the annular web 62, outer and inner spacer sleeves 73, 74 are positioned in registry with the set of upper and lower outer eyelets 76a, 76b and upper and lower inner eyelets 78a, 78b. These eyelets, in turn, are mounted around the upper and lower outer edge portions 80a, 80b and upper and lower inner edge portions 82a, 82b of the annular web 62. When the outer and inner threaded bolts 71, 72 are inserted through bores (not shown) in the outer clamping bars 68 and in the top flange 32, through the outer and inner eyelets 76a, 76b and 78a, 78b, and through the outer and inner spacer sleeves 73, 74 and finally screwed into bores (also not shown) present in the sealing ring terminus 51 and the inner clamping bars 70, the end result is shown in FIG. 1B.

FIG. 1C also illustrates the specific structure of the outer and inner edge portions 80a, 80b and 82a, 82b of the web 62. Both the outer and the inner side layers 84 and 88 include upper and lower flanges 86a, 86b and 90a, 90b, respectively. These upper and lower flanges 86a, 86b and 90a, 90b are joined by means of sealing seams 87 and 91, respectively. These seams 87, 91 are preferably formed from a flexible yarn made from No. 304 stainless steel, as are all of the other seams in the web 62 described hereinafter. The foregoing configuration advantageously folds inwardly all the rough edges of the woven stainless steel fabric forming the layers 66a, 66b, preventing these edges from snagging on a rough surface within the reactor and becoming unraveled. The edges may also be hemmed for additional protection against unraveling.

With reference again to FIG. 1B, at least one circular securing or quilting seam 92 is present at approximately the radial mid-line of the annular web 62. The purpose of this securing or quilting seam 92 is to ensure that the blanket 64 of non-woven fibers does not gather or bunch up between the top and bottom layers 66a, 66b of stainless steel cloth. If securing seam 92 were not present, the constant flexing of the annular web 62 caused by the differential thermal expansion and contraction of the guard vessel 3 (indicated in phantom in FIG. 1B) might cause a nonuniform distribution of the material forming the blanket 64 to occur between the top and bottom layers of heat-resistant fabric 66a, 66b. This, in turn, could result in heat leaks within the annular web 62. However, the provision of a centrally located securing seam 92 prevents such gathering or bunching up of the blanket 64 from occurring between the top and bottom layers 66a, 66b of stainless steel fabric. Additional quilting seams may be used for additional protection against gathering or bunching.

Turning now to FIGS. 2B and 3 and a description of the over-all structure of the annular web 62, this web is formed from ten arcuate sections 94, three arcuate boot sections 96a, 96b and 96c, and two insulating boots 98 and 101. The number of arcuate sections was chosen to minimize the number of joints that must be fieldsewn while still allowing the sections to be easily handled by the installers in the close quarters of this area during installation. However, if conditions permit, the web 62 may also be formed from a single, annular section of material. The arcuate sections 94 and arcuate boot sections 96a, 96c are jointed together in tandem. The remaining edge of each boot section 96a, 96c is joined to boots 98 and 101 as shown, as are both edges of boot section 96b. Insulating boots 98 and 101 circumscribe the sections of the sodium overflow conduit 15 and sodium make-up conduit 17 that extend through the web 62. Each of these boot structures 98 and 101 is generally formed from a pipe-receiving, semi-cylindrical section 99, 102 and a top cover cap 100, 103. A more detailed description of the boot structures 98 and 101 will be given hereinafter.

Turning now to FIG. 3, both the ten arcuate sections 94 and the two boot sections 96a, 96c are interconnected in tandem to one another by means of the same type of joint assembly 105. This joint assembly 105 is generally formed from a female end structure 106 present on each of the ten arcuate sections 94, and on boot section 96a. Each of these female end structures includes upper and lower female flanges 107a, 107b, and a C-shaped end layer 109 as shown. This female end structure 106 is maintained on the ends of each of the aforementioned arcuate sections 94 and boot section 96a by means of upper and lower securing seams 110a, 110b which create upper and lower hems in the top and bottom layers 66a, 66b of the stainless steel fabric forming the annular web 62. Preferably, these securing seams 110a, 110b do not extend completely through the annular web 62, but only as deep as is necessary to create the aforementioned hems in the top and bottom layers 66a, 66b of the heat-resistant fabric. Each of the joint assemblies 105 further includes a male end 111 present on the other end of each of the ten arcuate sections 94, as well as one end of the arcuate boot section 96c. This male end 111 is receivable within the upper and lower flanges 107a, 107b of the female end 106, and is securely mounted within the female end 106 by means of a transverse joining seam 113 which preferably is sewn completely through the web 62 in a multiple-circular fashion. In order to prevent any significant heat leaks from occurring in the joint assembly 105, a thermal sealing gasket 115 is provided between the C-shaped end layer 109 of the female end and the male end 111. This thermal sealing gasket 115 is preferably formed from the same thickness and density of Cerawool ® that forms the blanket 64 between the top and bottom layers 66a, 66b of the heat-resistant fabric. To complete the joint assembly 105, transverse blanket securing seams 117 are provided on either side of the transverse joining seam 113. These seams 117 serve to strengthen the joints between the arcuate sections 94 and 96a, 96b, 96c, and hence strengthen the web 62 as a whole.

Figure 4:
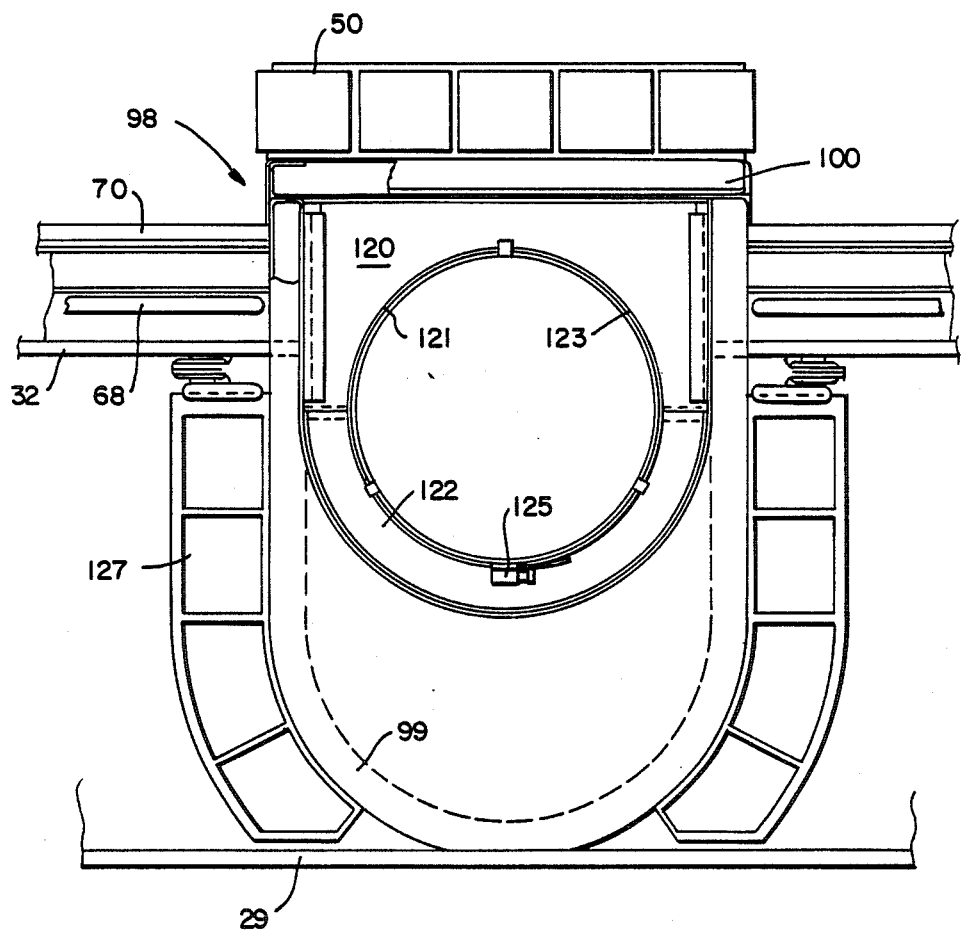
FIG. 4 is a back view of one of the boot structures of the web which may receive either the sodium overflow conduit or the sodium make-up conduit of the reactor.

FIG. 4 illustrates the particulars of the boots 98 and 101 which circumscribe the sodium overflow and sodium make-up conduits 15 and 17. Each of these boots 98 and 101 includes a sealing plate 120. This sealing plate 120 has a circular aperture 121 for admitting a conduit, a semi-circular flange around its bottom portion, and a generally flat top portion for supporting the previously mentioned top cover cap 100 or 103. Circumscribing the semi-circular flange 122 at the bottom of the sealing plate 120 is a clamping assembly 125 for clamping the edge of one of the semi-cylindrical sections 99, 102 of webbing which is generally formed the same as one of the previously mentioned arcuate sections 94 of the annular web 62. Each of the boot structures 98 and 101 also includes a semi-circular flange assembly 127 whose upper portion is mounted on the guard vessel extension 27, and whose lower rounded portion is mounted on the upper edge of the guard vessel proper 5. The other end of the previously mentioned semi-cylindrical section of webbing 99 or 102 is mounted around this semi-circular flange assembly 127. Additionally, a generous amount of slack is incorporated into the semi-cylindrical section of webbing so that, when the entire assembly is stitched together as shown in FIG. 4, a boot structure is formed around both the sodium overflow and make-up conduits 15 and 17 which is capable of radially and longitudinally flexing in response to the thermal differential expansion and contraction of the guard vessel 5 with respect to the reactor vessel 3 and the sealing ring 50.

FIG. 5 illustrates an alternate mounting configuration for the heat barrier 10 of the invention. In this particular configuration, the outer edge of the annular web 62 is clamped onto the top flange of the guard vessel 5 by inner clamping members 70 as previously described; however, the outer edge of the annular web 62 is clamped onto a snubber 130. Sealing flanges (not shown) are provided betweem the snubbers 130 which are uniformly spaced around the circumference of the reactor vessel 3 so that no thermal leakage will occur around the outer edge of the web 62. Again, sufficient slack is provided in the annular web 62 so that the web 62 will flex in response to thermal differential expansion and contraction of the guard vessel 5 relative to the snubbers 130 and the sealing flanges. This same slack will also prevent excessive, radially oriented tensile stresses from forming within the web 62 in the event that seismic disturbances laterally shake the reactor vessel 3 and guard vessel 5 relative to the reactor cavity 34. This configuration is particularly well suited for use with the bottom-supported reactor vessel which is specifically described and claimed in U.S. patent application Ser. No. 795,592 filed Nov. 6, 1985 by Jack Sharbaugh and assigned to the Westinghouse Electric Corporation, the entire specification of which is incorporated herein by reference.

While the inner edges of the web 62 may be directly clamped to a flange welded around the reactor vessel in reactors using either top supported reactor vessels or bottom supported reactor vessels, the aforementioned clamping configurations are preferred since they minimize the number of new weldments which must be provided on the upper surface of the guard vessel 5. Such minimization of weldments is important, since each new weldment placed on a guard vessel 5 or reactor vessel 3 must pass rigorous inspection standards. Of course, the annular web 62 may be mounted between the upper flange 32 of the guard vessel 3 and an upper flange or support ledge provided around the upper portion of the reactor vessel 3 if desired. Any mounting configuration which positions the web 62 between the cylindrical reactor cavity 38 and the annular space 6 with a moderate amount of slack is within the scope of the invention.

I claim:

1. A thermal barrier for insulating the reactor cavity of a nuclear reactor plant of the type having a reactor vessel surrounded by and spaced from a guard vessel, wherein convection currents are generated in the annular space therebetween, and wherein the upper end of said annular space terminates in an annular opening having an inner edge defined by the guard vessel, and an outer edge defined by a portion of the plant, and said opening communicates with said reactor cavity, comprising:

an annular web of flexible, heat-resistant material having inner and outer edges, and inner and outer mounting means for connecting said inner and outer edges of said web around said guard vessel edge and said portion of said plant, respectively, in order to cover said opening, said annular web being substantially uniformly gas permeable along its area to facilitate bleed-off of any pressurized gas present in said annular space, and having sufficient slack across its inner and outer edges to span the distance between said guard vessel edge and said portion of said plant regardless of the amount of thermal differential expansion that occurs therebetween.

2. The thermal barrier of claim 1, wherein said reactor plant further includes a sealing ring that defines the outer edge of said opening, and wherein said outer mounting means connects the outer edge of the annular web of flexible, heat-resistant material around said sealing ring.

3. The thermal barrier of claim 1, wherein said web includes a gas permeable blanket of fibers formed from a refractory material.

4. The thermal barrier of claim 3, wherein said blanket is covered by a metallic, heat-resistant and gas permeable fabric.

5. The thermal barrier of claim 3, wherein said fibers are formed from a mixture of alumina and silica.

6. The thermal barrier of claim 4, wherein said fabric is formed from stainless steel yarn.

7. The thermal barrier of claim 2, wherein the radial width of the annular web mounted between the sealing ring and the upper flange of the guard vessel by said mounting means is greater than the maximum distance that occurs between said ring and said upper flange as a result of differential thermal expansion, so that the web will continue to span the distance between the upper flange of the guard vessel and the sealing ring regardless of the amount of differential thermal expansion that occurs therebetween.

8. A thermal barrier for insulating the reactor cavity structure of a nuclear reactor plant of the type which includes a reactor vessel and a guard vessel and said cavity structure, wherein first and second annular spaces are present between the outer wall of the reactor vessel and the inner wall of the guard vessel and the outer wall of the guard vessel and the inner wall of the reactor cavity structure, respectively, and said first and second annular spaces communicate via an annular opening therebetween that has an inner edge and an outer edge, and wherein heat generated by the reactor vessel creates convection currents in the atmosphere of the first annular space comprising:

an annular web of flexible heat-resistant material having inner and outer edges, and inner and outer mounting means for connecting said inner and outer edges of said web around the inner and outer edges of the annular opening between the two annular spaces for substantially covering said annular opening and insulating said second annular space from said convection currents generated in said first annular space, said annular web being gas permeable along substantially all of its area to facilitate bleed-off of any pressurized gas present in said first annular space, and having sufficient slack across its inner and outer edges to flexibly span the distance between said inner and outer edges of said annular opening regardless of the extent to which the edges of said opening vary as a result of thermal differential expansion.

9. The thermal barrier of claim 8, wherein said web includes a gas permeable blanket of insulative material surrounded by a flexible, metallic fabric for strengthening the blanket of insulative material.

10. The thermal barrier of claim 8, wherein said web includes a blanket formed from fibers of a refractory material surrounded by a flexible, metallic and gas-permeable fabric formed from stainless steel yarn which strengthens the blanket, and protects the blanket from abrasion during the flexing thereof.

11. The thermal barrier of claim 8, wherein the reactor vessel is circumscribed by a support ledge, and wherein said inner and outer mounting means connects the inner and outer edges of the web to the support ledge of the reactor vessel and the wall of the guard vessel respectively, said support ledge and wall of the guard vessel defining the edges of said annular opening.

12. The thermal barrier of claim 8, wherein said inner and outer mounting means mounts the inner and outer edges of the web to a top edge of the guard vessel, and a flange mounted around an upper portion of the outside wall of the reactor vessel, respectively, said top edge and said flange defining the edges of said annular opening.

13. The thermal barrier of claim 8, wherein the reactor vessel is circumscribed by a support ledge, and wherein said inner and outer mounting means connects the inner and outer edges of the web between the support ledge of the reactor vessel, and the wall of the guard vessel, respectively, said support ledge and wall of the guard vessel defining the edges of said annular opening.

14. The thermal barrier of claim 8, wherein said annular web is formed from a plurality of arcuate segments connected together in tandem.

15. The thermal barrier of claim 8, wherein said web includes at least one boot structure for covering conduits which extend between the reactor vessel and the guard vessel.

16. The thermal barrier of claim 13, wherein both said inner and said outer mounting means each include a plurality of clamping members for maintaining the inner and outer edges of the annular web to both the support ledge of the reactor vessel and the wall of the guard vessel, respectively.

17. A thermal barrier for insulating the reactor cavity structure of a nuclear reactor plant of the type which includes a reactor vessel, a guard vessel, and said cavity structure, wherein a first annular space is defined between the walls of the reactor vessel and the walls of the guard vessel, and a second annular space is defined between the walls of the guard vessel and the reactor cavity structure, and said first and second annular spaces communicate via an annular opening therebetween that has an inner edge and an outer edge defined by the upper edge of the guard vessel and another component of the reactor plant, respectively, and wherein heat generated by the reactor vessel creates convection currents in the first annual space, comprising:
an annular web of flexible, heat-resistant material having inner and outer edges, and an inner and outer mounting means for connecting said inner and outer edges of said web around the upper edge of the guard vessel and said other component of the reactor plant, respectively, in order to completely cover said annular opening and to insulate the second annular space from the convection currents generated in the first annular space, said web being uniformly gas permeable throughout its area to facilitate a uniform bleed-off of any pressurized gas present in the first annular space, and being mounted with a sufficient amount of slack provided between the inner and outer edges of the web so that the web will flexibly span said annular opening despite thermal differential expansion between the guard vessel and the other component of the reactor plant.

18. The thermal barrier of claim 17, wherein said web includes a blanket formed from fibers of a refractory material surround by a flexible, metallic fabric formed from stainless steel wire which strengthens the blanket, and protects the blanket from mechanical abrasion during the flexing thereof.

19. The thermal blanket of claim 18, wherein the guard vessel is circumscribed by a sealing ring, and wherein the edges of the web are mounted between the upper edge of the guard vessel and the sealing ring, respectively.

20. A thermal barrier for insulating the reactor cavity structure of a nuclear reactor plant which includes a reactor vessel, and a guard vessel, and a reactor cavity structure, wherein a first annular space is defined between the walls of the reactor vessel and the guard vessel, and a second annular space is defined between the walls of the guard vessel and the reactor cavity structure, and said first and second annular spaces communicate via an annular opening having a first edge defined by an edge of the guard vessel, and a second edge defined by an edge of another component in the reactor plant, and wherein heat generated by the reactor vessel creates convection currents in the first annular space, comprising:
an annular web including a flexible, gas permeable blanket having an inner edge and an outer edge and formed from fibers of alumina-silica wrapped in fabric formed from woven stainless steel yarn, said web having at least one securing seam for securing the blanket to the surrounding stainless steel fabric,
a set of inner clamping bars for clamping the inner edge of the annular web to one edge of the opening between the two annular spaces,
a set of outer clamping bars for clamping the outer edge of the annular web to the other edge of said opening so that the web is completely and continuously disposed between said convection currents and said second annular space,
wherein the distance between said inner and outer edges of said web is larger than the distance between the edges of the opening so that sufficient slack is present in the web both around the web and between the inner and outer edges of the web so that said web will accommodate all dimensional changes occurring between the guard vessel and the other component of the reactor plant resulting from thermal differential expansion without being pulled taut, said web being uniformly gas permeable along substantially each point of its area to facilitate a uniform bleed-off of any pressurized gas present in said first annular space.

* * * * *